United States Patent [19]

Hess, II et al.

[11] 4,383,288
[45] May 10, 1983

[54] ADJUSTABLE LIGHT COLLECTOR AND SAMPLER THEREFOR

[75] Inventors: John E. Hess, II, Monroeville; Robert C. Braumuller, Pittsburgh, both of Pa.

[73] Assignee: Conservolite, Inc., Oakdale, Pa.

[21] Appl. No.: 186,647

[22] Filed: Sep. 12, 1980

[51] Int. Cl.³ .............................................. F21V 7/04
[52] U.S. Cl. ...................................... 362/32; 362/148; 362/295; 362/319; 362/362; 362/802; 362/396
[58] Field of Search .................. 362/32, 148, 295, 319, 362/362, 396, 802

[56] References Cited

U.S. PATENT DOCUMENTS

| 4,023,034 | 5/1977 | Schacht | 362/276 |
| 4,152,752 | 5/1979 | Niemi | 362/32 |
| 4,281,365 | 7/1981 | Elving et al. | 362/276 |
| 4,297,000 | 10/1981 | Fries | 362/32 |

*Primary Examiner*—Stephen J. Lechert, Jr.

*Attorney, Agent, or Firm*—Robert D. Yeager; Andrew J. Cornelius

[57] ABSTRACT

A light collector includes a light sampler for gathering light and a light receiver for receiving the light gathered by the sampler and for transmitting it to a system such as a light illumination control system. The output of the light collector varies with the intensity of the light gathered by the light sampler and can be increased or decreased for a given gathered light intensity by adjusting the distance between the light sampler and light receiver. Accordingly, if the light collector is used to provide to a light illumination control system the actual light intensity of the area in which light illumination is controlled, the light intensity maintained by the control system can be adjusted by increasing or decreasing the output of the collector. Also, the present invention includes a light gathering device for a light collector. The light gathering device includes a lens having angled portions for gathering light from a broad area.

22 Claims, 6 Drawing Figures

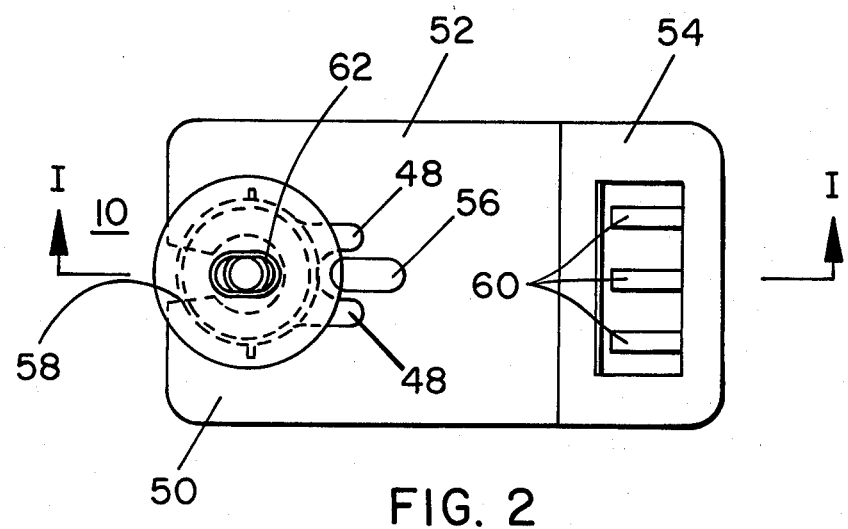
FIG. 2
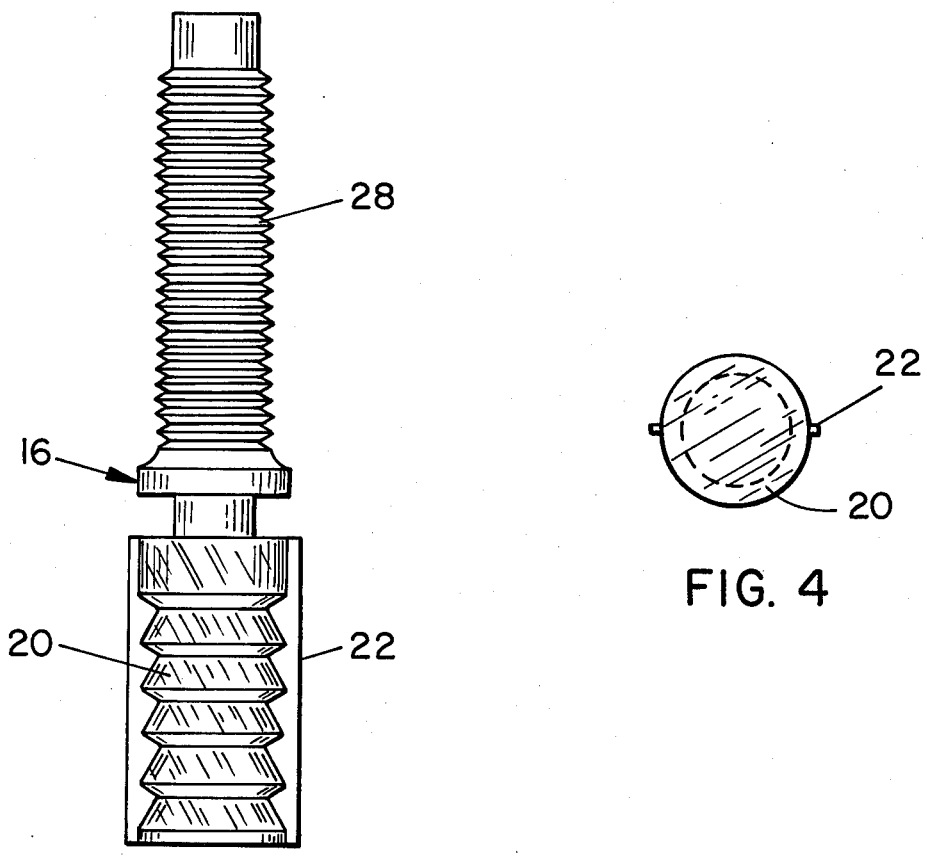
FIG. 3
FIG. 4

ADJUSTABLE LIGHT COLLECTOR AND SAMPLER THEREFOR

BACKGROUND OF THE INVENTION

1. Field of the Invention

This invention relates to a light collector and, more particularly, to a device for sampling light in an area illuminated in part by artificial means and producing an output adjustably dependent upon the level of intensity of the light present in that area.

2. Description of the Prior Art

The cost and relatively limited supply of resources needed to supply electrical power to commercial, industrial, and residential structures has forced owners and tenants of such structures to seek ways of minimizing the electrical power consumed by various systems needed to operate them.

Attempts to reduce the electrical power consumed by lighting systems range from using sophisticated electrical devices to simply removing a portion of the light sources from the lighting system.

One such attempt involves the use of a control system for maintaining the light illumination of an area constant by comparing the actual light intensity within the area to the desired light intensity therewithin and adjusting the amount of light produced by the lighting system if a difference exists between the actual and desired light intensities. Accordingly, when sunlight enters the area, thereby raising the illumination thereof, the system reduces the amount of light produced by the lighting system, thus reducing the amount of electrical power consumed thereby. Such a system includes apparatus for collecting light present in the area, a device—such as a photoresistor—for converting the output of the collector to an electrical signal related thereto, a device for providing an electrical signal representative of the desired light intensity within the area, a device for comparing the signals related to the actual and desired light intensities and generating an error signal related to the difference therebetween, and a device for modifying the output of the lighting sources in response to the error signal.

One collector that can be used in a system for controlling the light intensity in an area is sold by Prince Products, 78 Prince Street, Brooklyn, New York 11201. One disadvantage associated with such a collector is that the illumination level maintained by the control system within the area can be changed only by gaining access to a portion of the system that is usually hidden from the view of a person in the area. For example, if the collector is located in a suspended ceiling, the user must disassemble a portion of the ceiling to change the illumination level within the area. Accordingly, such a change can be made only at some inconvenience to the user.

Therefore, a need exists for a light collector for use in an illumination control system that enables a person to adjust the illumination maintained thereby conveniently and quickly.

SUMMARY OF THE INVENTION

The present invention provides a light collector for use in any application where it is desirable to permit the output of the collector to be adjustable for a given input to the collector and a light gathering device for the light collector. The output of the collector—either an electrical signal or transmitted light—is related to the intensity of the light input to the collector. The present invention is particularly useful in a system for controlling the illumination of an area, but is not limited to such an application. The present invention can be used in any device that requires a signal related to the light intensity present within an area.

The collector of the present invention provides an output that is related to the level of illumination of an area that is illuminated in part by artificial means. The output of the collector can be varied relative to the level of illumination of the area. Accordingly, the present invention can be used in a control system that maintains the illumination level of such an area of the type that compares the actual illumination intensity of the area to the desired illumination intensity thereof and generates an error signal related thereto and that adjusts the light output of the artificial lighting means in response to the difference between the actual and desired light intensities. The illumination level maintained by such a control system is usually adjusted by adjusting the desired illumination level input to the control system. However, the light level maintained by a control system having the present invention is adjusted by adjusting the output of the present invention.

The light collector of the present invention includes a light sampler for sampling light in an area illuminated in part by artificial means, a light receiver for receiving the sampled light from the sampler and producing the output of the collector, and apparatus for varying the amount of light received by the receiver from the light collector.

It is well known that the intensity of light decreases as it propagates. Accordingly, the light generated by a source is less intense at a given point than it is at points closer to the source generating the light. Further, the intensity of light is reduced by absorption each time it is reflected from a surface. Accordingly, the light collector can include apparatus by which the output of the collector can be varied by adjusting the distance between the sampler and the receiver, thus varying the amount of light received by the receiver. Preferably, such apparatus is easily accessible to one who desires to adjust the output of the collector. Although it is preferable to vary the amount of light received by the receiver by adjusting the distance between the sampler and receiver, the present invention contemplates any suitable apparatus for varying the amount of light received by the receiver. For example, the light collector can include a variable diffuser, a variable aperture or a slide plate to reduce the amount of light gathered by the sampler or transmitted from the sampler to the receiver.

The output of the present invention can be an electrical signal related to the actual light intensity if the receiver includes a photosensitive device—such as a conventional photoresistor—or it can be transmitted light if a remote circuit of the control system includes the photosensitive device. In the latter case, the light can be transmitted to the remote photosensitive device by a fiber optic member or a bundle thereof.

Preferably, the light receiver includes a housing that has formed therein a threaded bore and that is fixed to a stationary object to prevent rotation of the housing. In such a case, the sampler includes a threaded portion so that the sampler can be threaded within the receiver housing. The photosensitive device or light transmitter is located within the housing in such a location that by threading the sampler within the receiver housing the threaded portion is moved closer to or farther from the photosensitive device or light transmitter. Accordingly, the amount of light entering the sampler and passing through the threaded portion to the photosensitive device or light transmitter can be increased or decreased by adjusting the position of the threaded portion relative to the photosensitive or light transmitting device.

If the present invention is to be installed in a suspended ceiling, a bracket may be included for attachment to the T-bar of the ceiling and the light collector.

Although many known devices are suitable for sampling the light present in an area, a sampler having the novel light gathering device disclosed herein is preferable. A system for controlling the level of illumination in an area can function accurately only if it receives a signal representative of the illumination level in the area. Accordingly, such a system should include a light collector having a sampler that receives light from a number of directions. The sampler of the present invention includes a light gathering device having at least one light gathering angled surface which accepts light from all regions of the controlled area; accordingly, a light collector including such a sampler is able to provide a control system with a signal truly representative of the illumination level of the area.

Accordingly, the present invention is useful for providing a signal related to the actual illumination level of an area. The present invention is particularly useful for providing a signal the level of which can be varied for a given illumination level. The invention is also particularly useful in a control system for a lighting system where the illumination level of an area maintained by the control system must be easily adjustable.

BRIEF DESCRIPTION OF THE DRAWINGS

To enhance the understanding of the following detailed description of the preferred embodiments, reference can be made to the accompanying drawings, in which:

FIG. 2 is a top plan view of the collector and bracket shown in FIG. 1;

FIG. 3 is a side elevational view of the light sampler shown in FIG. 1;

FIG. 4 is a bottom view of the sampler shown in FIG. 3;

DETAILED DESCRIPTION OF THE PREFERRED EMBODIMENTS

Figure 1:
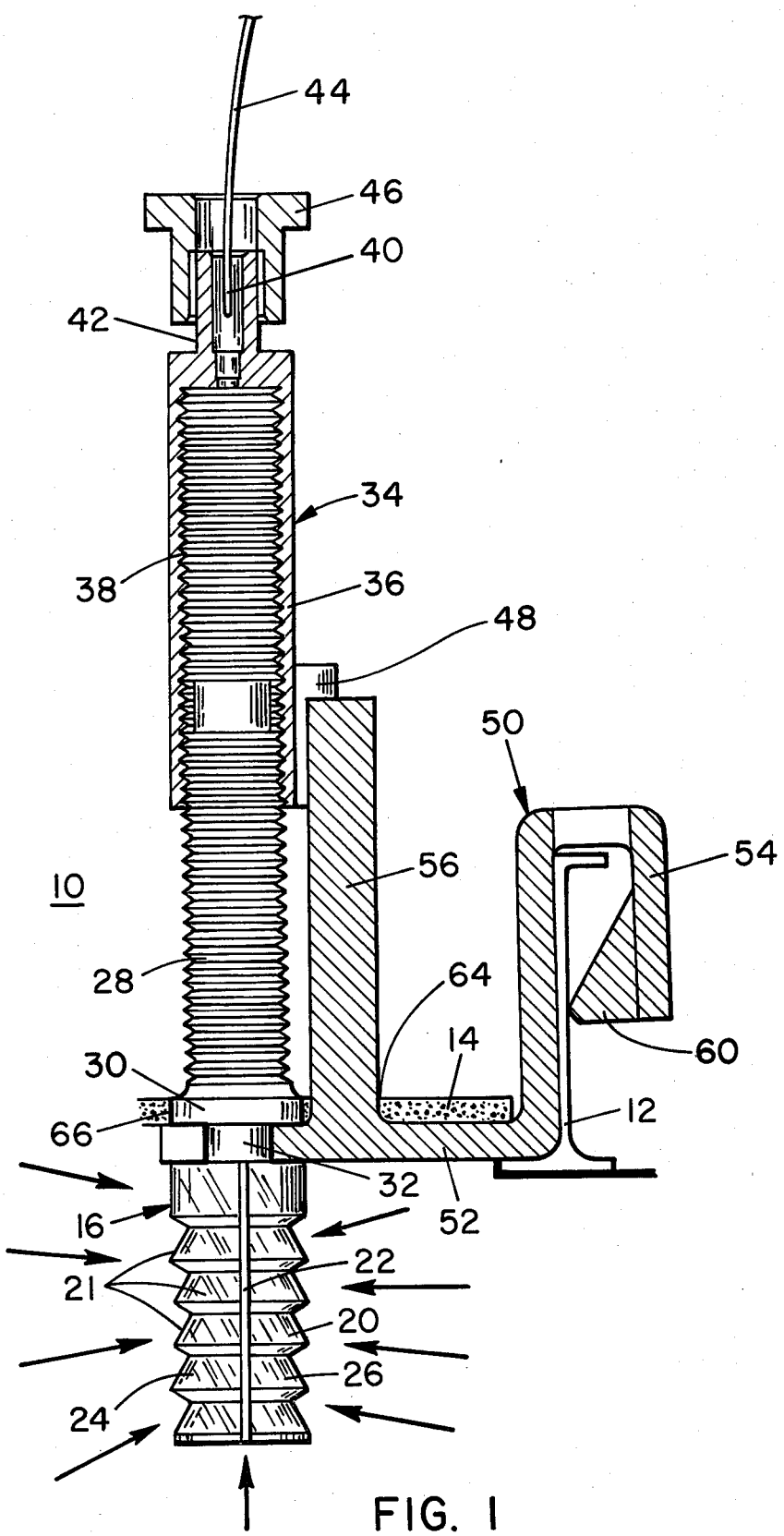
FIG. 1 is a side elevational view, partially in section, of a light collector constructed according to the provisions of the present invention and including a bracket, installed in a suspended ceiling.
Figure 5:
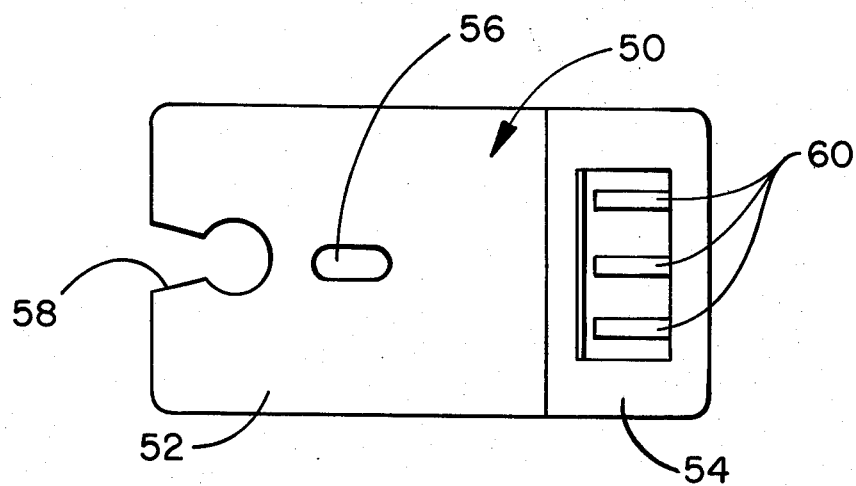
FIG. 5 is a top plan view of the bracket shown in FIG. 1.
Figure 6:
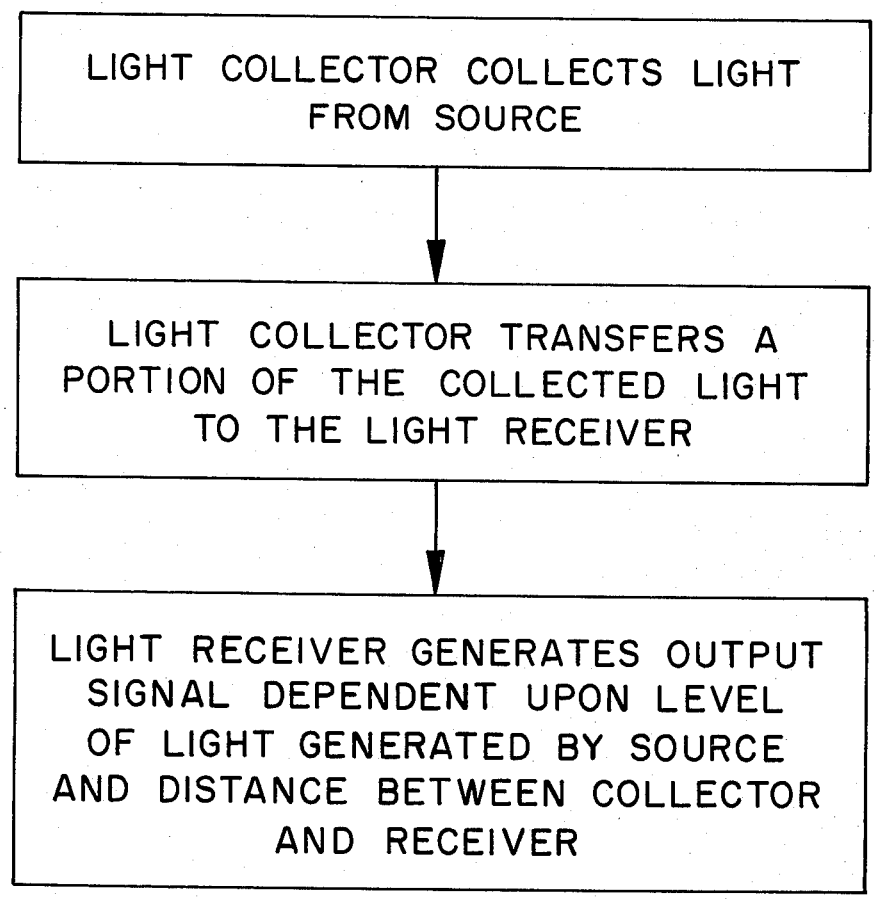
FIG. 6 is a block diagram illustrating the operation of the collector shown in FIG. 1.

The preferred embodiment of the present invention is shown in FIGS. 1 through 6 with a bracket and installed in a suspended ceiling having a T-bar 12 and a ceiling tile 14.

Light collector 10 includes light sampler 16 and light receiver 34. Light sampler 16 can be made of any nonyellowing lucite plastic. Gathering portion 20 of sampler 16 can be of any conventional construction and shape but is preferably of that shown in FIGS. 1 and 3 having angle portions 21. Such a shape broadens the area from which sampler 16 can collect light. Gathering portion 20 gathers light from the general directions indicated by the arrows shown in FIG. 1. Gathering portion 20 can include a web 22 that divides gathering portion 20 into two parts 24 and 26. One of parts 24 or 26 should be faced toward a window or other source of light that might cause collector 10 to generate a misleading signal. Whichever part 24 or 26 faces the window, or other such source, should be coated with an opaque material to prevent such erroneous signal generation. Web 22 facilitates coating part 24 or 26 with such a material. Sampler 16 also includes a threaded portion 28, a collar 30, and a bearing portion 32.

Light collector 10 also includes a light receiver 34 for receiving light gathered by gathering portion 20. Light receiver 34 includes a receiver housing 36 having a threaded bore 38 formed therein for threadably receiving threaded portion 28. End 42 of housing 36 has channel 40 formed therein to receive fiber optic bundle 44. Cap 46 fits over end 42 to secure fiber optic bundle 44 in place. Restraints 48 are formed on housing 36.

Although collector 10 can be secured directly to a ceiling tile 14, it is preferable that collector 10 be secured to mounting bracket 50. Bracket 50 includes base 52, mounting portion 54 and anchor portion 56. Base 52 includes slot 58 for accepting bearing portion 32 of sampler 16 and releasably securing sampler 16 to bracket 50. Mounting portion 54 includes tines 60.

Bracket 50 is installed in a suspended ceiling by removing tile 14 and slipping mounting portion 54 over T-bar 12 so that bracket 50 is in place as shown in FIG. 1. Bearing portion 32 of sampler 16 is slipped through slot 58 and, because bearing portion 32 is slightly larger than area 62 of slot 58, snaps in place. Holes 64 and 66 are formed in tile 14 and tile 14 is lowered onto base 52, anchor portion 56 passing through hole 64 and threaded portion 28 passing through hole 66 until collar 30 is disposed within hole 66. Fiber optic bundle 44 is inserted into channel 40 and cap 46 is fitted over end 42 of housing 36. A ceiling tile adjacent to tile 14 is removed and arranged so that anchor portion 56 is located between restraints 48. Restraints 48 prevent housing 36 from rotating when sampler 16 is rotated. Finally, threaded portion 28 is threaded into bore 38 and rotated until the desired light level is obtained.

The remote ends (not shown) of fiber optic bundle 44 can be directed onto the photosensitive device of an illumination level control system. Such systems are disclosed in U.S. Pat. Nos. 3,422,310 issued to Widmayer, and Re. 28,044; 3,659,147; and 3,781,598 all issued to Controlled Environment Systems, Inc. The remote ends of fiber optic bundle 44 are directed onto photosensitive devices No. 60, in Nos. 3,659,147 and 3,781,598, and No. 42 in Nos. 3,422,310 and 28,044.

In operation, ambient light enters gathering portion 20 and is transmitted in part through threaded portion 28 and received by fiber optic bundle 44. Fiber optic bundle 44 transmits the light to the photo sensitive device of the related illumination level control system.

As sampler 16 is threaded further into receiver 34, housing 36 is moved closer to sampler 16 and fiber optic bundle 44 receives a greater portion of the light passing through threaded portion 28 and transmits a greater portion thereof to the illumination level control system, thereby raising the illumination level in the controlled area. As sampler 16 is threaded further out of receiver 34 the opposite effect is achieved.

What is claimed is:

1. An adjustable light collector for use in a system adapted to continuously control the intensity of light present in an area irradiated at least in part by artificial means comprising:
- means positioned within the area for sampling the light present in the area;
- means for receiving a portion of said sampled light and transmitting at least part of said received portion to the device of the control system that converts light to electrical energy; and
- said sampling means including means for mechanically changing the amount of light received by said receiving means from said sampling means upon the repositioning of said changing means.

2. The adjustable light collector recited in claim 1 wherein said changing means changes the distance between the output of said sampling means and the input to said receiving means.

3. The adjustable light collector recited in claim 2 wherein said receiving means comprises:
- a housing adapted to accept at least a portion of said sampling means; and
- transducer means disposed within said housing for transforming the said portion of light received by said receiving means from said sampling means into an electrical signal.

4. The adjustable light collector recited in claim 3 wherein said changing means changes the distance between said transducer means and the output of said sampling means.

5. The adjustable light collector recited in claim 3 wherein said receiving means comprises:
- a housing adapted to accept at least a portion of said sampling means; and
- light transmitting means for receiving and transmitting at least a portion of the light received by said receiving means.

6. The adjustable light collector recited in claim 1 where said sampling means further includes:
- a light gathering portion for gathering a portion of the light present in the area; and
- a light transfer portion for transferring at least a portion of said gathered light to said receiving means.

7. The adjustable light collector recited in claim 6 wherein said changing means includes a threaded portion for threaded engagement with said receiving means.

8. In a system for controlling the intensity of light present in an area, said system including means for generating a first signal related to the desired amount of light present in an area which is illuminated at least in part by artificial means, means for generating a second signal related to the actual amount of light present in the area, means for comparing said signals and generating an error signal related to the difference therebetween, and means for altering the output of said artificial lighting means, said alteration being related to the magnitude of said error signal, the improvement comprising an adjustable light collector adapted to generate said second signal, said light collector comprising:
- means positioned within the area for sampling the intensity of light present in the area;
- means for receiving a portion of said sampled light; and
- said sampling means including means for mechanically changing the amount of light received by said receiving means from said sampling means upon the repositioning of said changing means.

9. The improvement recited in claim 8 wherein said changing means changes the distance between the output of said sampling means and the input to said receiving means.

10. The improvement recited in claim 9 wherein said receiving means comprises:
- a housing adapted to accept at least a portion of said sampling means; and
- transducer means disposed within said housing for transforming the said portion of light received by said receiving means from said sampling means into an electrical signal.

11. The improvement recited in claim 10 wherein said changing means changes the distance between said transducer means and the output of said sampling means.

12. The improvement recited in claim 9 wherein said receiving means comprises:
- a housing adapted to accept at least a portion of said sampling means; and
- light transmitting means for receiving and transmitting at least a portion of the light received by said receiving means.

13. The improvement recited in claim 10 wherein said sampling means further comprises:
- a light gathering portion for gathering a portion of the light present in the area; and
- a light transfer portion for transferring at least a portion of said gathered light to said transmitting means.

14. The improvement recited in claim 13 wherein said changing means includes a threaded portion for threaded engagement with said receiving means.

15. The improvement recited in claim 12 wherein said light transmitting means is a fiber optic member.

16. The improvement recited in claim 15 further comprising a bracket for securing said light collector to a suspended ceiling.

17. The improvement recited in claim 16 wherein said bracket comprises:
- a base to which said sampling means is rotatably fixed; and
- clamp means for releasably securing said bracket to the T-bar of a suspended ceiling.

18. The improvement recited in claim 17 wherein said bracket includes an anchor portion and said receiver housing is secured to said anchor portion.

19. The improvement recited in claim 16 wherein said light gathering portion includes at least one angled portion for gathering light from the area.

20. An adjustable light collector for use in a system adapted to control the intensity of light present in an area which is illuminated at least in part by artificial means comprising:
- a light gathering member having angled portions for gathering a portion of the light present in said area;
- a light receiver including a housing for receiving at least a portion of said gathered light;
- a light transfer member having a threaded portion for threaded engagement into said housing for transferring at least a portion of said gathered light to said light receiver; and
- restrainers for preventing rotation of said housing when said light gathering and transfer members are rotated.

21. A light gathering device for a light collector comprising a member having at least one angled portion so oriented as to gather a sample of the light present in a predetermined area, said light gatherer directing said sample to a specific location of said collector.

22. The light collector recited in claim 1 wherein said changing means changes the amount of light received by said receiving means by changing the extent to which said changing means physically blocks the light transmitted by said sampling means toward said receiving means.

* * * * *